United States Patent [19]

Terasawa

[11] Patent Number: 4,631,554

[45] Date of Patent: Dec. 23, 1986

[54] INK JET PRINTING APPARATUS WITH SUCTION RECOVERY UNIT

[75] Inventor: Koji Terasawa, Mitaka, Japan

[73] Assignee: Canon Kabushiki Kaisha, Tokyo, Japan

[21] Appl. No.: 536,736

[22] Filed: Sep. 28, 1983

[30] Foreign Application Priority Data

Oct. 4, 1982 [JP] Japan ............................... 57-174201

[51] Int. Cl.[4] ............................................. G01D 15/18

[52] U.S. Cl. ................................................ 346/140 R

[58] Field of Search .................................... 346/140 R

[56] References Cited

U.S. PATENT DOCUMENTS 4,383,263 5/1983 Ozawa ................................ 346/140

4,394,669 7/1983 Ozawa ................................ 346/140

4,403,233 9/1983 Terasawa ............................ 346/140

*Primary Examiner*—Joseph W. Hartary

*Attorney, Agent, or Firm*—Fitzpatrick, Cella, Harper & Scinto

[57] ABSTRACT

An ink jet printing apparatus has a printing head assembly for ejecting an ink as an ink drop from an opening on a printing medium, the ink being stored inside the ink jet printing apparatus; and an ejection recovery unit, arranged to communicate with the printing head assembly through a channel, for eliminating nonejection of the ink from the printing head assembly by generating a negative pressure, the ejection recovery unit being arranged to determine the negative pressure.

4 Claims, 4 Drawing Figures

INK JET PRINTING APPARATUS WITH SUCTION RECOVERY UNIT

BACKGROUND OF THE INVENTION

1. Field of the Invention

The present invention relates to an ink jet printing apparatus having a suction recovery unit for eliminating an ejection defect of a printing head.

2. Description of the Prior Art

In a conventional ink jet printing apparatus, ink will often not be ejected due to a change in temperature or an impact on the printing apparatus in the normal use. In this case, a bubble at the nozzle tip or an ink of a high viscosity at the nozzle tip is slightly drawn by a suction recovery unit having a small maximum suction capacity, thereby recovering injection capability. Furthermore, in an abnormal state wherein the printing apparatus is left at a high temperature of about 60° C. for a week or more, the viscosity of the ink is increased, and the ink tank and ink supply tube or the like are substantially filled with air. In the case of recovering the recording apparatus in the abnormal state described above, a plurality of operations must be performed with the suction recovery unit having such a small maximum suction capacity. In order to remove the highly viscous ink by one suction operation, it is proposed that the maximum suction capacity of the suction recovery unit is increased. However, when the bubble is formed at the nozzle tip or when the ink having a high viscosity is left only at the nozzle tip, ink is excessively drawn, resulting in an economical disadvantage.

When an initial space of the cylinder of a piston type suction recovery unit is very small, the negative suction force acting on the ink is excessively increased. Therefore, air dissolved in the ink becomes a bubble which floats around the nozzle and the filter, thereby resulting in ejection difficulties.

Even if the initial space of the cylinder is increased, the drawn ink is replaced with air in the initial space of the cylinder. As a result, the initial space becomes substantially small, thereby increasing the negative suction force of the ink and forming a bubble in the ink jet printing head.

SUMMARY OF THE INVENTION

It is an object of the present invention to provide an ink jet printing apparatus which effectively eliminates undesirable failure of ejection of ink.

It is another object of the present invention to accurately adjust a negative pressure generated in the ink jet printing apparatus.

It is still another object of the present invention to accurately detect an angular displacement of a pivot member.

It is still another object of the present invention to simplify the construction of the ink jet printing apparatus.

It is still another object of the present invention to automatically adjust the negative pressure generated in the ink jet printing apparatus.

It is still another object of the present invention to provide an ink jet printing apparatus in which the negative pressure generated therein is stable.

It is still another object of the present invention to effectively remove residual ink.

It is still another object of the present invention to provide an ink jet printing apparatus for quickly eliminating an ejection difficulty without wasting the ink.

Other objects, features and advantages of the present invention will be apparent from the following description of preferred embodiments taken in conjunction with the accompanying drawings.

BRIEF DESCRIPTION OF THE DRAWINGS

FIGS. 1 to 3 show an ink jet printing apparatus according to a first embodiment of the present invention, in which FIG. 1 is a perspective view thereof, FIGS. 2 and 3 are sectional views of a suction pump thereof.

DETAILED DESCRIPTION OF THE PREFERRED EMBODIMENTS

Figure 1:
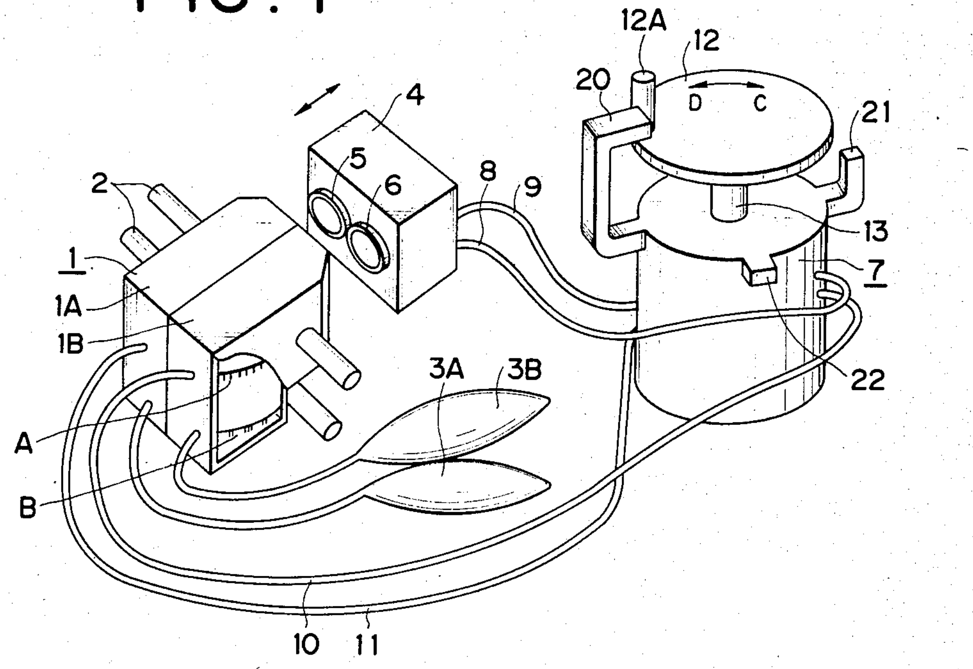
Figure 2:
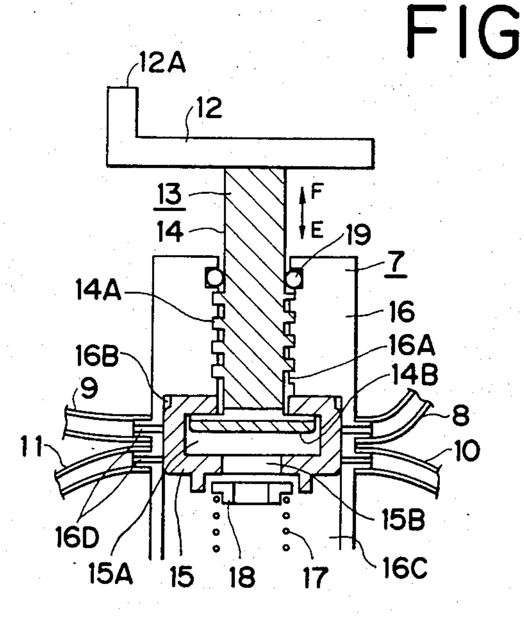

FIG. 1 is a perspective view of an ink jet printing apparatus according to a first embodiment of the present invention. A subtank 1 is moved along guide rails 2 and comprises a tank 1A for storing red ink and a tank 1B for storing black ink. Ink ejection nozzles (not shown) are disposed in the tanks 1A and 1B, respectively. Red and black inks are ejected from the tips of the ejection nozzles, respectively. The subtank 1 thus constitutes an ink jet printing head. Main tanks 3A and 3B for storing red and black inks are connected to the tanks 1A and 1B, respectively. The red ink is supplied from the main tank 3A to the tank 1A; and the black ink is supplied from the main tank 3B to the tank 1B. Openings (not shown) are formed in the tanks 1A and 1B to discharge excessive air therefrom, respectively. Air suction tubes 10 and 11 (to be described later) are securely connected to these openings, respectively. It should be noted that the tubes 10 and 11 may be detachably connected to these openings, respectively. A capping 4 for sealing the nozzles are disposed at the front side of the subtank 1 so as to be movable in a direction perpendicular to the guide rails 2. Elastic seal caps 5 and 6 are mounted on a surface of the capping which is brought into contact with the subtank 1. The nozzles of the tanks 1A and 1B are fitted in the caps 5 and 6, respectively. A suction pump 7 constitutes a suction recovery unit as a means for eliminating an ejection defect of the head. The suction pump 7 is connected to the capping 4 through ink suction tubes 8 and 9 as drawn ink passages. The suction pump 7 is also connected to the tanks 1A and 1B respectively through the tubes 10 and 11 as air passages. By utilizing these tubes 8 and 9 and the tubes 10 and 11, the suction pump 7 draws bubbles and excessive ink from the nozzles and excessive air from the tanks 1A and 1B, thereby recovering ejection defects of the nozzles and hence the printing head. A rotation control disc 12 is formed integrally with a piston 13. The rotation control disc 12 has a knob 12A at a peripheral portion of the upper surface thereof. As shown in FIG. 2, the piston 13 has a threaded portion 14A on its outer circumferential surface. The piston 13 comprises a shaft member 14 having a cover disc 14B and an elastic partition member 15 which abuts against the cover disc 14B of the shaft member 14.

The threaded portion 14A of the piston 13 is screwed with a threaded portion formed in a cylinder 16 as the recovering means (i.e., pump unit). When the rotation control disc 12 rotates in the direction indicated by arrow C in FIG. 1, the piston 13 moves downward. The cover disc 14B has a diameter greater than that of the piston shaft and can be vertically movable within a space 15A of the elastic partition member.

The elastic partition member 15 is made of an elastic material such as synthetic rubber and partitions the internal space of the cylinder 16 into an upper space 16B and a lower space 16C. A central opening 15B is formed in the elastic partition member 15. In the initial state shown in FIG. 2, the central opening 15B causes the upper space 16B to communicate with the lower space 16C. The lower space 16C is normally open to the outer atmosphere. The elastic partition member 15 is elastically fitted within the inner wall of the cylinder 16 and is vertically movable upon vertical movement of the piston 13. The diameter of the cover disc 14B is greater than that of the opening 15B of the partition member 15. When the piston 13 is moved downward i.e., in the direction indicated by arrow E, the cover disc 14B closes the opening 15B. In the process wherein the cover disc 14B closes the opening 15B, the residual ink in the upper space 16B and the space formed in the elastic partition member 15 is discharged in the lower space 16C. When the opening 15B is closed by the cover disc 14B, the volumes of the spaces 16B and 15A for generating a negative pressure by expansion are kept constant.

When the piston 13 is further rotated in the direction indicated by arrow C from the state wherein the opening 15B is closed by the cover disc 14B, the elastic partition member 15 moves downward within the cylinder 16 in the direction indicated by arrow E so as to generate a negative pressure in the spaces 16B and 15A. During the negative pressure generating process, connecting ports 16D of the tubes 8, 9, 10 and 11 which are closed by the elastic partition member in the initial state are opened, and the suction pump 7 draws the ink or air from the tubes 8, 9, 10 and 11. Thereafter, when the knob 12A of the rotation control disc 12 is rotated in the direction indicated by arrow D in FIG. 1, the piston 13 is moved upward in the direction indicated by arrow F by incorporating the biasing force of a spring 17. At the beginning of the return stroke, the ports 16D of the cylinder are opened, so that the spaces 16B and 15A are held at a negative pressure. In this condition, the elastic partition member 15 is moved upward to close the ports 16D. A biasing member having the spring 17 for biasing the elastic partition member 15 upward is stopped simultaneously when the ports 16D are closed. On the other hand, the shaft member 14 is continuously moved upward, and the cover disc 14B is separated from the elastic partition member 15, so that the spaces 15A and 16B communicate with the lower space 16C through the opening 15B. The ink drawn from the tubes 8, 9, 10 and 11 at the beginning of the return stroke is discharged in the lower space 16C through the opening 15B. An O-ring 19 seals between the shaft member 14 and the cylinder 16.

On the other hand, a stopper 20 is integrally formed with the cylinder 16, as shown in FIG. 1. The stopper 20 engages with the knob 12A to stop rotation of the rotation control disc 12 and the shaft member 14. The initial position of the rotation control disc 12 is set at the position where the knob 12A engages with the stopper 20, as shown in FIG. 1. Projections 21 and 22 indicate the stop positions of the rotation control disc 12.

The operation of the ink jet printing apparatus will now be described.

Figure 3:
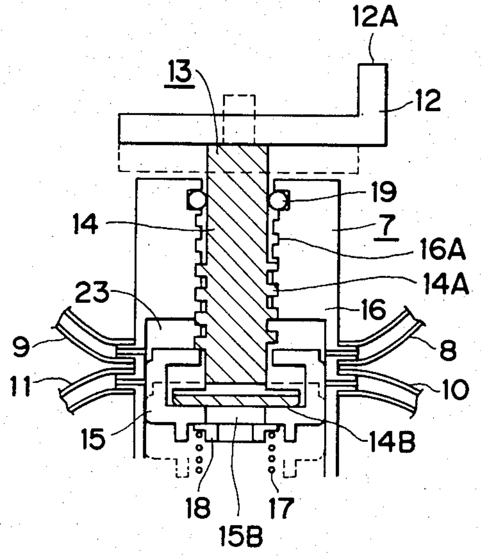

Assume that ejection defects of nozzles occur in normal operation (i.e., the ink level of the tank is indicated by reference symbol A). The capping 4 is brought into tight contact with the subtank 1 to rotate the rotation control disc 12 through about 180° in the direction indicated by arrow C. This indicates the first suction recovery mode. The piston 13 is moved downward. In this case, the shaft member 14 is first moved downward so as to allow the lower surface of the cover disc 14B to discharge the residual ink and then to close the opening 15B of the elastic partition member 15, thereby moving the elastic partition member 15 downward. The spaces 16B and 15A which are defined by the upper surface of the inner wall of the cylinder 16 and the upper surface of the elastic partition member 15 are held in a negative pressure. Furthermore, the elastic partition member 15 opens the ink suction tubes 8 and 9, so that the bubbles and ink are drawn from the nozzles through the tubes 8 and 9. FIG. 3 shows a state wherein the rotation control disc 12 is rotated through 180°, so that the elastic partition member 15 closes the air suction tubes 10 and 11. Thereafter, when the rotation control disc 12 is rotated in the direction indicated by arrow D, the state shown in FIG. 2 is obtained.

In the ejection defect recovery in normal operation, the first mode is set wherein the rotation control disc 12 is rotated through 180°. Air and ink are drawn only from the nozzles, thereby preventing suction of the excessive ink.

Now assume that the ink level in the tank is set at the position indicated by reference numeral B (i.e., an abnormal nonejection state). In this case, the rotation control disc 12 is rotated from the initial position through about 270°, which is given as a second suction recovery mode. The elastic partition member 15 is moved downward to a position indicated by the broken line in FIG. 3. The air suction tubes 10 and 11 are opened and excessive air is also drawn from the tanks 1A and 1B through the tubes 10 and 11, so that the normal ink level can be effectively restored.

Figure 4:
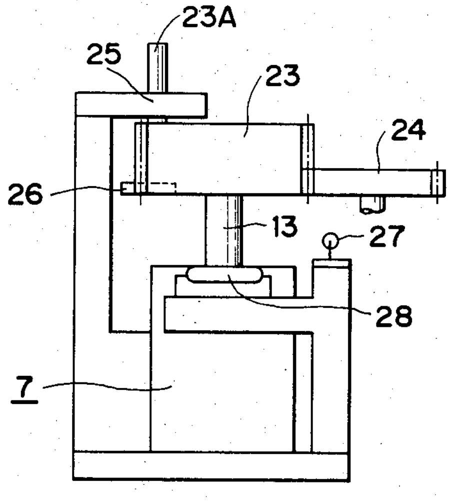
FIG. 4 is a side view of an ink jet printing apparatus according to a second embodiment of the present invention.

An ink jet printing apparatus according to a second embodiment of the present invention is shown in FIG. 4 in which suction recovery is automatically performed. A rotation control disc 23 integrally formed with a piston 13 also serves as a gear since gear teeth are formed around its outer circumferential surface. The rotation control disc 23 meshes with a drive gear 24 and is driven by a motor therethrough. A knob 23A is formed on a peripheral portion of the upper surface of the rotation control disc 23. The knob 23A engages with a stopper 25 fixed on a suction pump 7 in its initial state. The rotation control disc 23 is located at the initial position in FIG. 4. A magnet 26 is fixed on the peripheral portion of the lower surface of the rotation control disc 23. Reed switches 27 and 28 are arranged on the predetermined side surface portions of the suction pump 7. The switch 27 is turned on when the rotation control disc 23 is rotated from the initial position through 180°. The switch 28 is turned on when the rotation control disc 23 is rotated through 270°.

According to the second embodiment, when no ejection is performed by the printing apparatus, an ink level sensor (not shown) arranged in the subtank detects whether the nonejection is occurring in the normal operation or abnormal operation. The detection signal from the ink level sensor is used to control an angular displacement of the rotation control disc 23. When the ejection difficulty occurs in normal operation, the motor is driven to rotate the rotation control disc 23 through 180°, and then the reed switch 27 is turned on. The motor is stopped for a short period of time and is then started to rotate the rotation control disc 23 in the opposite direction. The rotation control disc 23 is then restored to the initial position. When the ejection difficulty occurs in the abnormal state, the motor is driven to rotate the rotation control disc 23 through 270°. Upon rotation of the rotation control disc 23 through 270° and turning on of the reed switch 28, the motor is stopped and is driven in the opposite direction, thereby restoring the rotating control disc 23 to the initial position.

By using power of the motor for driving the drive gear 24, the capping 4 is brought into tight contact with the front surface of the subtank, thereby completely automating suction recovery.

The present invention is not limited to an on-demand ink jet printing apparatus, but can be extended to a bubble jet type ink jet printing apparatus, a printing apparatus for performing printing on a printing sheet by spraying an ink drop. Various changes and modifications may be made within the spirit and scope of the present invention.

In the above embodiments, the negative pressure is determined in accordance with the angular displacement of the rotation control disc. However, it is apparent that a downward displacement of the piston can be detected by a mark or a switch to obtain the same effect. In this case, the downward displacement of the piston is preferably enhanced by a lever mechanism.

What is claimed is:

1. An ink jet printing apparatus comprising:

printing means for ejecting an ink as an ink drop from an opening onto a printing medium, the ink being stored inside said ink jet printing apparatus;

suction means, arranged to communicate with said printing means through a channel, for eliminating nonejection of the ink from said printing means by generating a negative pressure, said suction means having (i) a main body with a predetermined space therein, and (ii) a rotatable member, supported for rotational movement with respect to said main body, for generating the negative pressure in said space upon rotational movement thereof, said main body including means for detecting an angular position of said rotatable member; and an operation member for enabling said rotatable member to be manually rotated.

2. An apparatus according to claim 1 wherein said rotatable member has a threaded portion which is in threaded engagement with said main body.

3. An ink jet printing apparatus comprising:

printing means for ejecting an ink as an ink drop from an opening onto printing medium, the ink being stored inside said ink jet printing apparatus;

suction means, arranged to communicate with said printing means through a channel, for eliminating nonejection of the ink from said printing means by generating a negative pressure, said suction means having (i) a main body with a predetermined space therein, and (ii) a rotatable member, supported for rotation with respect to said main body, for generating the negative pressure in said space upon rotational movement thereof;

detecting means for detecting an angular position of said rotatable member; and driving means for driving said rotatable member to a desired angular position on the basis of the detection result of said detecting means.

4. An apparatus according to claim 3, wherein said rotatable member has a portion which is in threaded engagement with said main body.

* * * * *

UNITED STATES PATENT AND TRADEMARK OFFICE

CERTIFICATE OF CORRECTION

PATENT NO. : 4,631,554

DATED : December 23, 1986

INVENTOR(S) : KOJI TERASAWA

It is certified that error appears in the above-identified patent and that said Letters Patent is hereby corrected as shown below:

COLUMN 1

Line 17, "injection" should read --ejection--.

COLUMN 6

Line 14, "wherein" should read --wherein,--.

Signed and Sealed this

Twenty-eighth Day of April, 1987

*Attest:*

DONALD J. QUIGG

*Attesting Officer* *Commissioner of Patents and Trademarks*